United States Patent [19]

Shaw et al.

[11] Patent Number: 5,346,961
[45] Date of Patent: Sep. 13, 1994

[54] PROCESS FOR CROSSLINKING

[75] Inventors: Richard G. Shaw, Millstone; Paul J. Caronia, Succasunna, both of N.J.

[73] Assignee: Union Carbide Chemicals & Plastics Technology Corporation, Danbury, Conn.

[21] Appl. No.: 43,564

[22] Filed: Apr. 7, 1993

[51] Int. Cl.$^5$ ................................................ C08F 8/00
[52] U.S. Cl. ...................................... 525/281; 525/287; 525/300; 525/304; 525/305; 525/308; 525/309; 264/211.24
[58] Field of Search ............... 525/281, 287, 300, 304, 525/305, 308, 309; 264/211.24

[56] References Cited

U.S. PATENT DOCUMENTS 3,954,907 5/1976 Schober .............................. 260/875
4,018,852 4/1977 Schober .............................. 260/878

Primary Examiner—Bernard Lipman
Attorney, Agent, or Firm—Saul R. Bresch

[57] ABSTRACT

A process for crosslinking comprising (a) introducing into a reactor, under crosslinking conditions, a mixture comprising
(i) one or more polyolefins;
(ii) organic peroxide;
(iii) an ester, ether, or ketone containing two or more unsaturated groups; and
(iv) a compound having the formula:

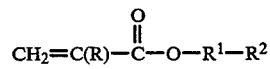

wherein R=hydrogen, methyl, or ethyl;
$R^1$=an alkylene having 1 to 6 carbon atoms;
and
$R^2$=an alkyl having 8 or more carbon atoms or $Si(R^3)_3$ wherein $R^3$ is hydrogen or alkoxy having 1 to 6 carbon atoms; each $R^3$ is the same or different; and at least one $R^3$ is an alkoxy, and (b) crosslinking the polyolefin(s).

10 Claims, No Drawings

PROCESS FOR CROSSLINKING

TECHNICAL FIELD

This invention relates to the crosslinking of polyolefins, particularly, the extrusion of same about an electrical conductor or communications medium followed by crosslinking.

BACKGROUND INFORMATION

In the extrusion of insulation made from high pressure low density polyethylene, organic peroxide compounds are commonly mixed with the polyethylene to provide a catalyst for crosslinking subsequent to extrusion. It is difficult, if not impossible, to find an acceptable extrusion temperature for linear polymers (such as those produced in gas phase fluidized reactors) as well as highly viscous polymers and compounds under production type conditions with conventional peroxides because the high extrusion temperatures encountered while extruding these materials results in decomposition of the peroxide in the extruder leading to premature crosslinking known as scorch. This problem also occurs in processes other than extrusion processes such as rotomolding, injection molding, and blow molding.

DISCLOSURE OF THE INVENTION

An object of this invention, therefore, is to provide a process for crosslinking whereby the decomposition temperatures of conventional peroxide catalysts are extended upwards a sufficient number of degrees thus essentially avoiding decomposition of the peroxides in the extruder and the concomitant scorch.

Other objects and advantages will become apparent hereinafter.

According to the present invention, the above object is met by a process for crosslinking comprising (a) introducing into a reactor, under crosslinking conditions, a mixture comprising
 (i) one or more polyolefins;
 (ii) organic peroxide;
 (iii) an ester, ether, or ketone containing two or more unsaturated groups; and
 (iv) a compound having the formula:

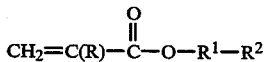

wherein R=hydrogen, methyl, or ethyl;
$R^1$=an alkylene having 1 to 6 carbon atoms; and
$R^2$=an alkyl having 8 or more carbon atoms or $Si(R^3)_3$ wherein $R^3$ is hydrogen or alkoxy having 1 to 6 carbon atoms; each $R^3$ is the same or different; and at least one $R^3$ is an alkoxy,
(b) and crosslinking the polyolefin(s).

DESCRIPTION OF THE PREFERRED EMBODIMENTS(S)

The polyolefins used in this invention are generally thermoplastic resins, which are crosslinkable. They can be homopolymers or copolymers produced from two or more comonomers, or a blend of two or more of these polymers, conventionally used in film, sheet, and tubing, and as jacketing and/or insulating materials in wire and cable applications. The polyolefins can be generally defined as homopolymers or copolymers of one or more unsaturated monomers. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, rnaleic arthydride, vinyl chloride, vinylidene chloride, vinyl alcohol, tetrafiuoroethylene, and chlorotrifiuoroethylene; and acrylic acid, methacrylic acid, and other similar unsaturated acids. Hydrogenated styrene-butadiene copolymers can be included among the polyolefins.

The homopolymers and copolymers referred to can be non-halogenated, or halogenated in a conventional manner, generally with chlorine or bromine. Examples of halogenated polymers are polyvinyl chloride, polyvinylidene chloride, and polytetrafiuoroethylene. The homopolymers and copolymers of ethylene and propylene are preferred, both in the non-halogenated and halogenated form. Included in this preferred group are terpolymers such as ethylene/propylene/diene monomer rubbers.

With respect to polypropylene: homopolymers and copolymers of propylene and one or more other alpha-olefins wherein the portion of the copolymer based on propylene is at least about 60 percent by weight based on the weight of the copolymer can be used to provide the polyolefin of the invention. The polypropylene can be prepared by conventional processes such as the process described in U.S. Pat. No. 4,414,132. The alpha-olefins in the copolymer are preferably those having 2 or 4 to 12 carbon atoms.

The polyethylene can be generally defined as a homopolymer of ethylene or a copolymer of ethylene and one or more unsaturated comonomers. They can be prepared by conventional high pressure or low pressure processes. Generally, the monomers useful in the production of the copolymers will have 3 to 20 carbon atoms, and preferably 3 to 12 carbon atoms. As noted above, examples of these monomers are alpha-olefins such as propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; and diolefins such as 1,4-pentadiene, 1,3-hexadiene, 1,5-hexadiene, 1,4-octadiene, and ethylidene norbornene, which are commonly the third monomer in a terpolymer.

The homopolymers or copolymers of ethylene wherein ethylene is the primary comonomer and the homopolymers and copolymers of propylene wherein propylene is the primary comonomer may be referred to herein as polyethylene and polypropylene, respectively.

The polyethylene can be, for example, a high pressure polyethylene having a density in the range of 0,915 to about 0.955 gram per cubic centimeter and a melt index in the range of about 0.1 to about 100 grams per 10 minutes. High pressure polyethylenes and the process for making them are well known and are described in Introduction to Polymer Chemistry, Stille, Wiley and Sons, New York, 1962, pages 149 to 153. Melt index is determined in accordance with ASTM D-1238, Condition E, and measured at 190° C.

The polyethylene can also be, for example, a linear low density polyethylene (LLDPE) having a density in the range of 0.915 to 0.925 gram per cubic centimeter and a melt index in range of about 0.1 to about 100 grams per 10 minutes or a very low density polyethylene (VLDPE), which is also linear. Both the linear low density and the very low density polyethylenes and methods for preparing them have also been described in the literature, the linear low density polyethylene, e.g., in U.S. Pat. No. 4,101,445.

The VLDPE is preferred. It can be a copolymer of ethylene and at least one alpha-olefin having 3 to 12 carbon atoms and preferably 3 to 8 carbon atoms. The density of the VLDPE is equal to or less than 0.915 gram per cubic centimeter and is preferably no lower than 0.860 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. The catalysts and the processes for making the VLDPE are described, respectively, in U.S. Pat. No. 4,101,445; U.S. Pat. No. 4,302,565; and European patent application 120 501.

The melt index of the VLDPE can be in the range of about 0.1 to about 50 grams per 10 minutes and is preferably in the range of about 0.4 to about 10 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be a diene such as ethylidene norbornene, butadiene, 1,4-hexadiene, and a dicyclopentadiene. The third comonomer can be present in an amount of about 1 to 15 percent by weight based on the weight of the copolymer and is preferably present in an amount of about 1 to about 10 percent by weight. It is preferred that the copolymer contain two or three comonomer inclusive of ethylene.

The organic peroxide preferably has a decomposition temperature of 100° to 220° C. for a half-life of 10 minutes and is exemplified by the following compounds (the numbers set off by the parentheses are their decomposition temperatures (°C.)): succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di(benzoyl peroxy)hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2,5-di(t-butylperoxy)hexane (155), t-butyl cumyl peroxide (155), t-butyl hydroperoxide (158), di-t-butyl peroxide (160), 2,5-dimethyl-2,5-di(t-butyl peroxy)hexane-3 (170), and alpha, alpha'-bis-t-butylperoxy- 1,4-diisopropylbenzene (160).

The ester, ether, or ketone containing at least 2, and preferably 3, unsaturated groups can be, for example, a cyanurate, an isocyanurate, a phosphate, an ortho formate, an aliphatic or aromatic ether, or an allyl ester of benzene tricarboxylic acid. The number of carbon atoms in the ester, ether, or ketone can be in the range of 9 to 40 or more, and is preferably 9 to 20. Preferred esters, ethers, and ketones are essentially non-volatile at storage temperatures, and the unsaturated groups are preferably allyl groups. Specific examples are triallyl cyanurate (TAC), which is preferred; triallyl- 1,3,5-triazine-2,4,6( 1H,3H,5H)-trione also known as triallyl isocyanurate (TALC); triallyl phosphate; triallyl ortho formate; tetra-allyloxy-ethane; triallyl benzene- 1,3,5 -tricarboxylate; zinc dimethacrylate; ethoxylated bisphenol A dimethacrylate; methacrylate terminated monomer with average chain length of $C_{14}$ or $C_{15}$; pentaerythritol tetraacrylate; dipentaerythritol pentaacrylate; pentaerythritol triacrylate; dimethylolpropane tetraacrylate; ethoxylated trimethylolpropane triacrylate; trimethylolpropane triacrylate; and 2,4,6-triallyl-1,3,5-trione. Also see U.S. Pat. No. 4,018,852.

The structural formulas for TAC and TAIC are as follows:

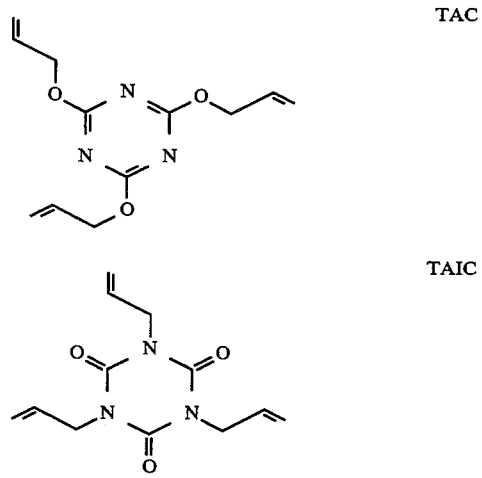

The fourth component is a vinyl ester having the following formula:

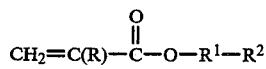

wherein R=hydrogen, methyl, or ethyl;
$R^1$=an alkylene having 1 to 6 carbon atoms; and
$R^2$=an alkyl having 8 or more carbon atoms or $Si(R^3)_3$ wherein $R^3$ is hydrogen or alkoxy having 1 to 6 carbon atoms; each $R^3$ is the same or different; and at least one $R^3$ is an alkoxy.

Examples of suitable vinyl esters are lauryl methacrylate; which is preferred; myristyl methacrylate; palmityl methacrylate; stearyl methacrylate; 3-methacryloxypropyltrimethoxysilane; 3-methacryloxypropyltriethoxy-silane; cyclohexyl methacrylate; n-hexylmethacrylate; isodecyl methacrylate; 2-methoxyethyl methacrylate; tetrahydrofurfuryl methacrylate; octyl methacrylate; 2-phenoxyethyl methacrylate; isobornyl methacrylate; isooctylmethacrylate; octyl methacrylate; isooctyl methacrylate; and oleyl methacrylate.

Preferably, R is $CH_3$; $R^1$ has 1 to 4 carbon atoms; the $R^2$ alkyl has 8 to 18 carbon atoms; and the $R^3$ alkoxy has 1 to 4 carbon atoms.

Based on 100 parts by weight of polyethylene, the proportions of the compounds can be about as follows:

| Component | Broad Range | Preferred Range |
|---|---|---|
| | (parts by weight) | |
| (ii) organic peroxide | 0.2 to 2.0 | 0.5 to 1.4 |
| (iii) unsaturated compound | 0.1 to 1.8 | 0.2 to 0.8 |
| (iv) vinyl compound | 0.1 to 2.0 | 0.5 to 1.5 |

It should be understood that these proportions can vary outside of the stated ranges depending on the desired properties. For example, to achieve a low dissipation factor in wire and cable applications, the amount of allylic compound can be lowered and the amount of peroxide raised. Variations can also be considered for other properties such as heat aging characteristics and tensile properties.

The process of the invention can be carried out in various types of extruders, e.g., single or twin screw types. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. For the purposes of this specification, it will be understood that the term "extruder" includes, in addition to conventional extruders, (i) injection molding apparatus, the die of the extruder being analogous to the injector of the injection molding apparatus, and (ii) the combination of an extruder, crosshead, die, and a heating or cooling zone where a further forming of the material can be accomplished. The heating or cooling follows the die and may be, for example, an oven. In wire coating, where the material is crosslinked after extrusion, the die of the crosshead feeds directly into a heating zone, and this zone can be maintained at a temperature in the range of about 130° C. to about 260° C., and preferably in the range of about 170° C. to about 220° C. The same temperature ranges can be used in injection molding. The wire to be coated can be an electrical conductor or any medium for the transmission of communications such as a fiber optic material, e.g., glass fibers.

The extrudate is then crosslinked by exposing it to a temperature greater than the decomposition temperature of the organic peroxide. Preferably, the peroxide employed is decomposed through four or more half-lives. The crosslinking can be accomplished in, for example, an oven or a continuous vulcanizable tube.

Conventional additives can be added to the polymer either before or during processing. The amount of additive is usually in the range of about 0.01 to about 50 percent based on the weight of the resin. Useful additives are antioxidants, ultraviolet absorbers, antistatic agents, pigments, carbon black, dyes, fillers, slip agents, fire retardants, plasticizers, processing aids, lubricants, stabilizers, smoke inhibitors, halogen scavengers, flow aids, lubricants, and viscosity control agents.

Advantages of the invention are low scorch, higher useful extrusion temperatures, less molecular weight degradation of copolymer, less dusting of resin due to peroxide sweat out, and, under suitable circumstances, higher throughput of wire or cable through the continuous vulcanizing oven.

The patents, patent application, and other publication mentioned in this specification are incorporated by reference herein.

The invention is illustrated by the following examples.

EXAMPLES 1 TO 11

The materials used in each example are mixed on a two roll mill or other mixer such as a Brabender Plasticorder TM mixer heated to the minimum temperature required to allow the resin to flux (generally, 130° C. or less). The resins used in the examples contain 0.35 percent by weight antioxidant and 0.35 percent by weight DSTDP (distearylthiodipropionate). These additives are added prior to the addition of all other materials. After fluxing, components (iii) and (iv), if any, are added and mixed. Finally, the peroxide is added and mixed.

The antioxidant is thiodiethylene bis(3, 5-di-tert-butyl-4-hydroxyhydrocinnamate.

To obtain rheometer values in minutes and inch-pounds, a Monsanto TM rheometer 2000 oscillating over a 0.5 degree arc at 182° C. or 197° C. (examples 4 and 11 only) is used. The Monsanto rheometer test procedure is described in U.S. Pat. No. 4,018,852.

Material containing about 6 grams of the above composition is added to the rheometer as a disc cut from a 0.125 inch plaque pressed at about 130° C.

The results are reported as (a) the time in minutes required for the rheometer to reach one inch-pound over the minimum value found in the rheometer curve (referred to as "Time" in the Table) and (b) the value in inch-pounds at which the rheometer becomes constant regardless of time (referred to in the Table under "Rheometer" as "Maximum").

A composition, which will successfully avoid scorch, is one in which the Time is greater than 1.1 minutes. For the majority of applications, a Rheometer Maximum of at least 2.5 inch-pounds is desirable. Preferably "Time" should be greater than Predicted Time. "Predicted Time" is the time predicted for each example when components (iii) and (iv) are not used. It is calculated as follows: For each combination of peroxide and polymer, 3 to 10 mixtures of concentrations spanning the concentration range of interest are prepared and their rheometer curves determined in a Monsanto TM Rheometer 2000 at an appropriate temperature using a 0.5° arc. Exponential equations are fitted to the experimental points generated in the rheometer curve, for example, the maximum value in inch-pounds attained during a time span which allows for 10 half-lives of the peroxide at that temperature, or "Time". These data are then used to develop a relationship between rheometer maximum and "Time". Thus for simple peroxide containing polymer systems, we can predict what "Time" will be for any given rheometer maximum included within the range of the predictive curves. Table comparisons should be made horizontally (within each example) as opposed to vertically (between examples).

The materials are referred to in the Table as follows:

I. Component (i):

A = a copolymer of ethylene and 1-butene having a density of 0.884 g/cc; an MI of 0.4 g/10 rain; and an MFR of 40, B = a copolymer of ethylene and 1-hexene having a density of 0.905 g/cc; an MI of 4 g/10; rain; and an MFR of 40.

C = a copolymer of ethylene and 1-butene having a density of 0,905 g/cc; an MI of 4 g/10 rain; and an MFR of 40.

D = a copolymer of ethylene and 1-butene having a density of 0.900 g/cc; an FI of 25 g/10 rain; and an MFR of 60.

E = a copolymer of ethylene and 1-butene having a density of 0,900 g/cc; an MI of 1 g/10 rain; and an MFR of 40.

Note: MI = melt index determined under ASTM D-1238, Condition E, at 190° C and 2.16 kilograms.

FI = flow index determined under ASTM D-1238, Condition F, at 190° C. and 21.6 kilograms.

MFR = melt flow ratio, which is the ratio of flow index to melt index.

II. Component (ii):

F = dicumyl peroxide

G = 2,5-dimethyl-2,5-di-(t-butylperoxy)-3-hexyne

H = alpha, alpha'-(bis-t-butylperoxy) -diisopropylbenzene

J = t-butyl cumyl peroxide

III. Component (iii):

TAC = triallyl cyanurate

TAIC = triallyl isocyanurate

EBAD = ethoxylated Bisphenol A dimethacrylate

Component (iv):

LM = lauryl methacrylate

MOPTMS = 3-methacryloxypropyltrimethoxysilane

SM = stearyl methacrylate

TABLE

| Example | Resin | Weight Percent Peroxide | Component (iii) | Component (iv) | Time (minutes) | Rheometer Maximum (inch-pounds) | Predicted Time (minutes) |
|---|---|---|---|---|---|---|---|
| 1 | C | F | TAC | LM | | | |
| a | | 98.2 | 1.1 | 0 | 0 | 1.38 | 2.83 | 1.37 |
| b | | 96.9 | 1.4 | 0 | 1 | 1.14 | 3.83 | 1.04 |
| c | | 97.8 | 0.5 | 1 | 0 | 0.94 | 4.29 | 0.95 |
| d | | 96.6 | 1.1 | 0.4 | 1.2 | 1.43 | 4.10 | 0.95 |
| e | | 95.8 | 1.1 | 0.6 | 1.8 | 1.84 | 3.84 | 1.04 |
| 2 | C | F | TAC | MOPTMS | | | |
| a | | 98.05 | 1.25 | 0 | 0 | 1.24 | 3.30 | 1.19 |
| b | | 96.75 | 1.55 | 0 | 1 | 0.95 | 4.36 | 0.95 |
| c | | 97.65 | 0.65 | 1 | 0 | 0.83 | 4.79 | 0.89 |
| d | | 96.65 | 0.65 | 1 | 1 | 1.18 | 4.04 | 1.00 |
| e | | 95.7 | 0.8 | 0.8 | 2 | 1.55 | 4.62 | 0.91 |
| 3 | C | F | TAC | SM | | | |
| a | | 98.20 | 1.1 | 0 | 0 | 1.40 | 2.87 | 1.35 |
| b | | 97.05 | 1.25 | 0 | 1 | 1.21 | 3.19 | 1.23 |
| c | | 97.80 | 0.5 | 1 | 0 | 0.92 | 4.27 | 0.96 |
| d | | 96.65 | 0.65 | 1 | 1 | 0.93 | 4.66 | 0.90 |
| e | | 96.83 | 1.10 | 0.4 | 1.6 | 1.44 | 3.95 | 1.10 |
| 4 | B | G | TAC | LM | | | |
| a | | 98.28 | 1.02 | 0 | 0 | 3.48 | 1.55 | 3.16 |
| b | | 98.00 | 2.00 | 0 | 0 | 1.54 | 3.45 | 3.18 |
| c | | 97.20 | 1.10 | 0 | 1 | 2.80 | 1.89 | 2.74 |
| d | | 97.80 | 1.20 | 0 | 1 | 2.55 | 2.06 | 2.55 |
| e | | 97.62 | 0.68 | 1 | 0 | 1.25 | 3.66 | 1.49 |
| f | | 98.80 | 0.70 | 1 | 0 | 1.20 | 3.83 | 1.43 |
| g | | 96.37 | 0.93 | 1 | 1 | 1.99 | 3.97 | 1.37 |
| h | | 97.07 | 0.93 | 1 | 1 | 1.97 | 4.08 | 1.34 |
| i | | 94.62 | 0.68 | 2 | 2 | 4.08 | 2.33 | 2.30 |
| j | | 95.20 | 1.00 | 1.8 | 2 | 2.15 | 5.04 | 1.11 |
| 5 | B | H | TAC | LM | | | |
| a | | 98.28 | 1.02 | 0 | 0 | 2.10 | 2.79 | 2.02 |
| b | | 96.10 | 1.20 | 0 | 1 | 1.68 | 3.50 | 1.49 |
| c | | 97.91 | 0.39 | 1 | 0 | 1.48 | 4.47 | 1.28 |
| d | | 96.37 | 0.93 | 1 | 1 | 2.59 | 5.14 | 1.16 |
| e | | 96.34 | 0.66 | 1.6 | 1.4 | 2.33 | 4.46 | 1.23 |
| 6 | E | F | TAC | LM | | | |
| a | | 98.2 | 1.1 | 0 | 0 | 0.79 | 6.33 | 0.79 |
| b | | 96.9 | 1.4 | 0 | 1 | 0.86 | 7.30 | 0.73 |
| c | | 97.8 | 0.5 | 1 | 0 | 0.69 | 7.82 | 0.71 |
| d | | 96.5 | 0.8 | 1 | 1 | 1.14 | 7.91 | 0.70 |
| e | | 94.9 | 0.8 | 1.8 | 1.8 | 1.35 | 7.40 | 0.73 |
| 7 | B | F | TAIC | LM | | | |
| a | | 98.4 | 1.55 | 0 | 0 | 1.43 | 2.70 | 1.43 |
| b | | 97.3 | 1.7 | 0 | 1 | 1.12 | 3.22 | 1.21 |
| c | | 98.2 | 0.8 | 1 | 0 | 0.91 | 3.26 | 1.20 |
| d | | 96.9 | 1.1 | 1 | 1 | 1.32 | 4.10 | 0.99 |
| e | | 96.2 | 0.8 | 1.8 | 1.2 | 1.54 | 3.90 | 1.03 |
| 8 | B | F | EBAB | LM | | | |
| a | | 98.00 | 2.0 | 0 | 0 | 1.16 | 3.67 | 1.08 |
| b | | 97.15 | 1.85 | 0 | 1 | 1.07 | 3.51 | 1.12 |
| c | | 97.45 | 1.55 | 1 | 0 | 0.95 | 3.30 | 1.19 |
| d | | 96.45 | 1.55 | 1 | 1 | 1.29 | 3.15 | 1.24 |
| e | | 94.5 | 1.7 | 2.0 | 1.8 | 1.71 | 3.30 | 1.19 |
| 9 | A | F | TAC | LM | | | |
| a | | 98.45 | 1.55 | 0 | 0 | 0.83 | 5.15 | 0.81 |

TABLE-continued

| Example | Resin | Weight Percent | | | Time (minutes) | Rheometer Maximum (inch-pounds) | Predicted Time (minutes) |
|---------|-------|----------|----------------|---------------|---------|----------|----------|
|         |       | Peroxide | Component (iii) | Component (iv) |         |          |          |
| b       | 97.3  | 1.7  | 0   | 1   | 0.84 | 5.69 | 0.75 |
| c       | 98.2  | 0.8  | 1   | 0   | 0.66 | 6.48 | 0.68 |
| d       | 96.9  | 1.1  | 1   | 1   | 1.01 | 6.91 | 0.66 |
| e       | 95.45 | 0.95 | 1.8 | 1.8 | 1.37 | 6.33 | 0.70 |
| 10      | B     | J    | TAC | LM  |      |      |      |
| a       | 98.76 | 1.24 | 0   | 0   | 1.58 | 3.96 | 1.55 |
| b       | 97.54 | 1.46 | 0   | 1   | 1.92 | 2.99 | 2.07 |
| c       | 98.2  | 0.8  | 1   | 0   | 1.25 | 3.82 | 1.59 |
| d       | 96.87 | 1.13 | 1   | 1   | 2.01 | 4.14 | 1.59 |
| e       | 96.07 | 1.13 | 1.2 | 1.6 | 2.86 | 3.63 | 1.67 |
| 11      | D     | G    | TAC | LM  |      |      |      |
| a       | 99.15 | 0.85 | 0   | 0   | 1.19 | 3.36 | 1.62 |
| b       | 99.00 | 1.00 | 0   | 0   | 1.86 | 3.10 | 1.75 |
| c       | 98.24 | 0.76 | 0   | 1   | 1.64 | 3.19 | 1.70 |
| d       | 98.10 | 0.90 | 0   | 1   | 2.14 | 3.09 | 1.76 |
| e       | 98.74 | 0.26 | 1   | 0   | 1.24 | 4.51 | 1.22 |
| f       | 98.75 | 0.25 | 1   | 0   | 2.73 | 2.60 | 2.08 |
| g       | 97.49 | 0.51 | 1   | 1   | 1.94 | 4.31 | 1.27 |
| h       | 97.45 | 0.55 | 1   | 1   | 2.49 | 3.72 | 1.46 |
| i       | 97.14 | 0.26 | 1.8 | 0.8 | 2.57 | 2.70 | 2.00 |
| j       | 96.20 | 0.60 | 1.6 | 1.6 | 2.38 | 3.75 | 1.45 |

Notes to Table:
1. Densities, melt indices, flow index, and melt flow ratios are approximate.
2. Component (iii) refers to the allyl containing esters (see definition above).
3. Component (iv) refers to the vinyl esters (see definition above).

We claim:

1. A process for crosslinking comprising (a) introducing into a reactor, under crosslinking conditions, a mixture comprising
   (i) one or more polyolefins;
   (ii) organic peroxide;
   (iii) an ester, ether or ketone containing two or more unsaturated groups; and
   (iv) a compound having the formula:

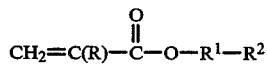

wherein R = hydrogen, methyl, or ethyl;
   $R^1$ = an alkylene having 1 to 6 carbon atoms; and
   $R^2$ = an alkyl having 8 or more carbon atoms or $Si(R^3)_3$ wherein $R^3$ is hydrogen or alkoxy having 1 to 6 carbon atoms; each $R^3$ is the same or different; and at least one $R^3$ is an alkoxy,
   and (b) crosslinking the polyolefin(s).

2. The process defined in claim 1 wherein the polyolefin is a polyethylene.

3. The process defined in claim 1 wherein the organic peroxide is dicumyl peroxide.

4. The process defined in claim 1 wherein component (iii) is triallyl cyanurate.

5. The process defined in claim 1 wherein component (iv) is lauryl methacrylate.

6. The process defined in claim 1 wherein for each 100 parts by weight of polyolefin, the proportions are about as follows:

| Component | Parts by Weight |
|-----------|----------------|
| (ii)  | 0.2 to 2.0 |
| (iii) | 0.1 to 1.8 |
| (iv)  | 0.1 to 2.0 |

7. A process for extrusion comprising (a) introducing into an extruder a mixture of (i) VLDPE, and, for each 100 parts by weight of VLDPE, the following components in about the following proportions:

| Component | Parts by Weight |
|-----------|----------------|
| (ii) dicumyl peroxide | 0.2 to 2.0 |
| (iii) triallyl cyanurate or triallyl isocyanurate | 0.1 to 1.8 |
| (iv) lauryl methacrylate | 0.1 to 2.0 |

(b) extruding the mixture at a temperature in the range of about 130° to about 260° C., and (c) crosslinking the extrudate.

8. A composition comprising:
   (i) one or more polyolefins;
   (ii) organic peroxide;
   (iii) ester, ether, or ketone containing two or more unsaturated groups; and
   (iv) a compound having the formula:

| Component | Parts by Weight |
|-----------|----------------|
| (ii) dicumyl peroxide | 0.2 to 2.0 |
| (iii) triallyl cyanurate or triallyl isocyanurate | 0.1 to 1.8 |
| (iv) lauryl methacrylate | 0.1 to 2.0 |

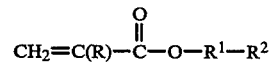

wherein R = hydrogen, methyl, or ethyl;
   $R^1$ = an alkylene having 1 to 6 carbon atoms; and
   $R^2$ = an alkyl having 8 or more carbon atoms or $Si(R^3)_3$ wherein $R^3$ is hydrogen or alkoxy having 1 to 6 carbon atoms; each $R^3$ is the same or different; and at least one $R^3$ is an alkoxy, 9. The composition defined in claim 8 wherein the polyolefin is polyethylene.

10. A composition comprising:
    (i) VLDPE, and for each 100 parts by weight of VLDPE, the following components in about the following proportions:

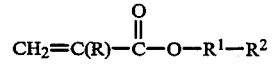

* * * * *

UNITED STATES PATENT AND TRADEMARK OFFICE
CERTIFICATE OF CORRECTION

PATENT NO. : 5,346,961
DATED : September 13, 1994
INVENTOR(S) : Shaw et al

It is certified that error appears in the above-identified patent and that said Letters Patent is hereby corrected as shown below:

Move the information set forth at column 10, lines 44 to 48, to column 10, line 67.

Cancel the formula at column 10, line 67.

Signed and Sealed this

Twenty-second Day of November, 1994

Attest:

BRUCE LEHMAN

*Attesting Officer*  *Commissioner of Patents and Trademarks*